United States Patent [19]

Kishii et al.

[11] Patent Number: 4,963,085
[45] Date of Patent: Oct. 16, 1990

[54] CELL FILM BREAKING APPARATUS FOR FOAMED PRODUCTS

[75] Inventors: Ryuji Kishii, Yokohama; Akinori Takemiya, Chigasaki, both of Japan

[73] Assignee: Bridgestone Corporation, Tokyo, Japan

[21] Appl. No.: 482,477

[22] Filed: Feb. 21, 1990

[30] Foreign Application Priority Data

Feb. 21, 1989 [JP] Japan .................................. 1-39257

[51] Int. Cl.$^5$ ............................................ B29C 59/02
[52] U.S. Cl. .................................... 425/385; 264/293; 264/321
[58] Field of Search ................. 425/385; 264/293, 321

[56] References Cited

U.S. PATENT DOCUMENTS 3,405,217 10/1968 Garrett et al. ..................... 264/321
3,477,525 10/1969 Peters .................................. 264/321

FOREIGN PATENT DOCUMENTS 2007388 9/1971 Fed. Rep. of Germany ...... 425/385

Primary Examiner—Willard Hoag
Attorney, Agent, or Firm—Sughrue, Mion, Zinn, Macpeak & Seas

[57] ABSTRACT

A cell film breaking apparatus is used for breaking cell films of foamed products to change independent formed cells to continuous cells of the foamed products. The apparatus includes a conveyor for transferring the foamed products through the apparatus, a frame arranged above the conveyor to be raised and lowered relative to the conveyor by means of a reciprocating device, a plurality of pressing devices mounted on the frame and arranged in rows to be urged upward relative to the frame, cams arranged corresponding to the pressing devices to drive the pressing devices downward, respectively, and rotating driving device for rotating the cams in synchronism with each other. With this arrangement of the apparatus, all cell films of foamed products can be broken without omission at a high ratio of broken cell films to unbroken cell films with less man-hours.

9 Claims, 5 Drawing Sheets

CELL FILM BREAKING APPARATUS FOR FOAMED PRODUCTS

BACKGROUND OF THE INVENTION

This invention relates to a cell film breaking apparatus for breaking cell films of foamed products made of urethane foam or the like to change independent foamed cells to continuous foamed cells. More particularly it relates to an apparatus for breaking cell films of foamed products made of metals, synthetic resins or the like having embedded reinforcing members in two or three dimensional shapes without any damage, deformation or the like of the reinforcing members, thereby greatly improving elasticity of the foamed products.

In order to break cell films of foamed products, various methods have been known. For example, foamed products are caused to pass through two rolls which are rotated in opposite directions to break cell films of the products. In another technique, foamed products are accommodated in a vacuum chamber and pressure in the vacuum chamber is lowered to a negative pressure of the order of 400–700 mmHg to break cell films by the pressure difference across the cell films. In a further method, compressed air is forced into foamed products by means of a device such as an air pistol to break cell films.

In the method of using two rolls rotating in opposite directions for causing foamed products to pass therethrough, however, there is a risk of reinforcing members (if embedded in the products) being damaged or deformed. In this case, moreover, there is a difficulty that foamed products may be ruptured by embedded reinforcing members having three dimensional shapes. With the second method using the vacuum chamber under a negative pressure of the order of 400–700 mmHg, further, a ratio of broken cell films to unbroken cell films is a low value so that elasticity of the foamed products is not sufficiently improved. The third method, using a device such as an air pistol, can only locally break cell films of such foamed products, so that with bulky foamed products increased man-hours are imperative. Moreover, it is very difficult to break all the cell films uniformly or without omission. Worse still, the formed products are likely to be ruptured at locations where air is forced into the products.

SUMMARY OF THE INVENTION

It is an object of the invention to provide an improved cell film breaking apparatus for foamed products which effectively eliminates the disadvantages of the prior art as above described and which is able to break cell films of foamed products sufficiently uniformly over the entire foamed products with high ratios of broken cell films to unbroken cell films with high efficiency and without breakage and deformation of the foamed products and reinforcing members thereof.

In order to accomplish the object, a cell film breaking apparatus for foamed products according to the invention comprises transfer means for transferring the foamed products through the apparatus, an apparatus frame arranged above the transfer means to be raised and lowered relative to the transfer means by means of reciprocating means, a plurality of pressing means mounted on the apparatus frame to be urged upward relative thereto, cam means driving the pressing means downward, respectively, and rotating driving means for rotating the cam means in synchronism with each other.

In breaking cell films of a foamed product with the apparatus according to the invention, the transfer means is stopped when the foamed product has arrived at a predetermined position in the apparatus, and the apparatus frame is then lowered by actuating the reciprocating means to lower the pressing means to proper positions corresponding to a thickness of the foamed product. Thereafter, the rotating driving means is actuated to cause rotations of the respective cam means and hence alternate downward and upward movements of the pressing means. The downward movements of the pressing means are caused by the cam means, whereas the upward movements are caused for example by coil springs.

In this manner, the foamed product is compressed in a predetermined sequence to predetermined thicknesses by pressing portions preferably in the form of hemispheres provided at lower ends of the plurality of the pressing means. Such pressing is repeated plural times, for example, 5–15 times to completely break all cell films at the pressed portions of the foamed product.

After completion of the cell film breaking operation at particular portions, the rotating driving means is stopped and the apparatus frame are raised successively. Thereafter, the transfer means is driven a predetermined distance and the same operation as the above is repeated. These operations are carried out over the entire length or width of the foamed product.

As above described, the plurality of pressing means separately press the foamed product in a predetermined sequence. Therefore, even if one of the pressing means presses a portion of the foamed product in coincidence with an embedded reinforcing member, the remaining portions of the embedded reinforcing member can relatively freely move in the foamed product without being restrained by the other pressing means. Therefore, such free displacements of the reinforcing members can effectively prevent any deformation and damage of the embedded reinforcing members as well as rupture of the foamed product itself.

This effect is more significant when the pressing means are constructed so as not exert forces larger than a predetermined value onto the foamed body.

Moreover, according to the invention the ratio of broken cell films to unbroken cell films of the pressed foamed product can be greatly improved by mechanically pressing the foamed product by the use of the respective pressing means with a predetermined compression ratio. Therefore, by repeatedly applying such a pressing action onto all over the foamed product, all the cell films of the foamed product can be broken uniformly or without omission with less man-hours without causing any rupture of the foamed product to improve the elasticity of the foamed product.

The invention will be more fully understood by referring to the following detailed specification and claims taken in connection with the appended drawings.

DETAILED EXPLANATION OF THE PREFERRED EMBODIMENTS

Figure 1:
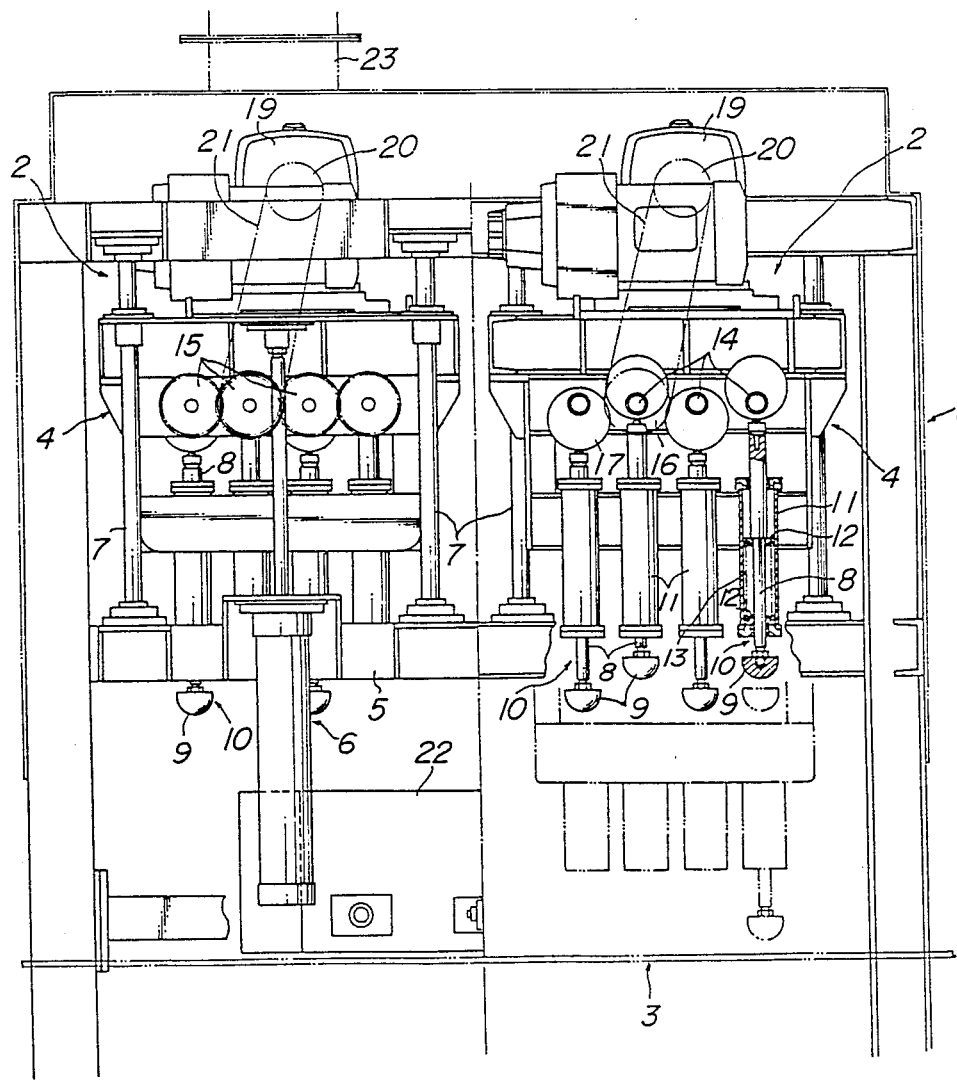
FIG. 1 is a partial sectional side view illustrating one embodiment of the apparatus according to the invention.

FIG. 1 is a partial sectional view illustrating one embodiment of the invention, wherein the apparatus according to the invention is arranged in a stationary frame 1 in the form of a gate viewed in a front and a side elevation. A slat conveyor 3, as one example of transfer means, is arranged at a lower portion of the frame 1 for feeding foamed products through the stationary frame 1.

Above the slat conveyor 3 in the stationary frame 1 there is provided an apparatus frame 4 which is connected to reciprocating means, comprising two pneumatic cylinders 6 upstandingly mounted on intermediate braces 5 of the stationary frame 1 in this embodiment. As a result, when the pneumatic cylinders 6 are actuated in synchronism with each other, the apparatus frame 4 is smoothly moved in vertical directions with the aid of four guide rods 7.

Figure 2:
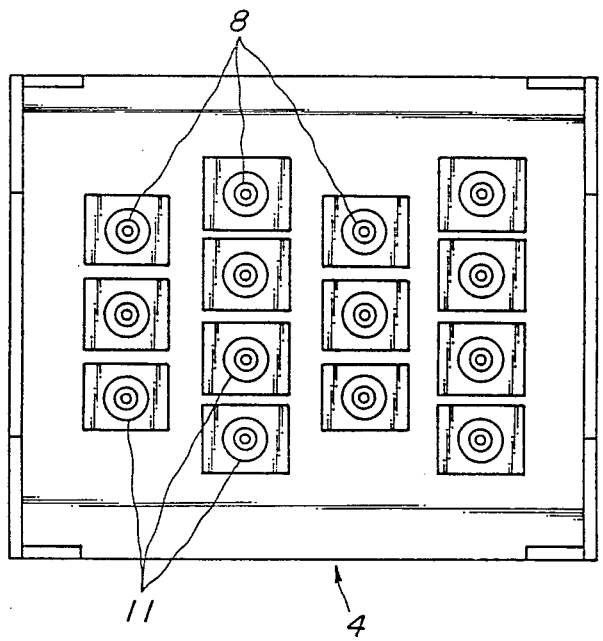
FIG. 2 is a plan view illustrating one example of an arrangement of pressing means according to the invention.

As shown in the right half portion of FIG. 1, at a lower portion of the apparatus frame 4 there is provided a plurality of pressing means 10 each comprising a rod-like member 8 and a preferably hemispherical pressing portion 9 located at a lower end of the rod-like member 8. The pressing means 10 are arranged for example in four rows. The number of the pressing means 10 in one of the rows are three, four, three and four in sequence from the left side viewed in FIG. 2 and the respective pressing means 10 are arranged staggered with respect to those in the adjacent rows.

The rod-like member 8 of each of the pressing means 10 thus arranged is inserted into each of cylindrical members 11 upstandingly mounted on the apparatus frame 4. A coil spring 13 is interposed between an intermediate portion of the rod-like member 8 and an inner lower end of the cylindrical member 11 so that the each of the pressing means 10 is mounted onto the apparatus frame 4 so as to be urged upward relative thereto.

In this case, a projection area of the pressing portion 9 of the pressing means 10 on a horizontal surface is preferably 10–80 cm$^2$ in view of the surface pressure distribution. A radius of curvature of the hemispherical pressing portion 9 may be properly selected preferably within a range of 5–50 mm. Moreover, the number of the pressing means 10 may be for example 5–20 with the means 10 arranged as closely as possible without interfering with each other.

Figure 3:
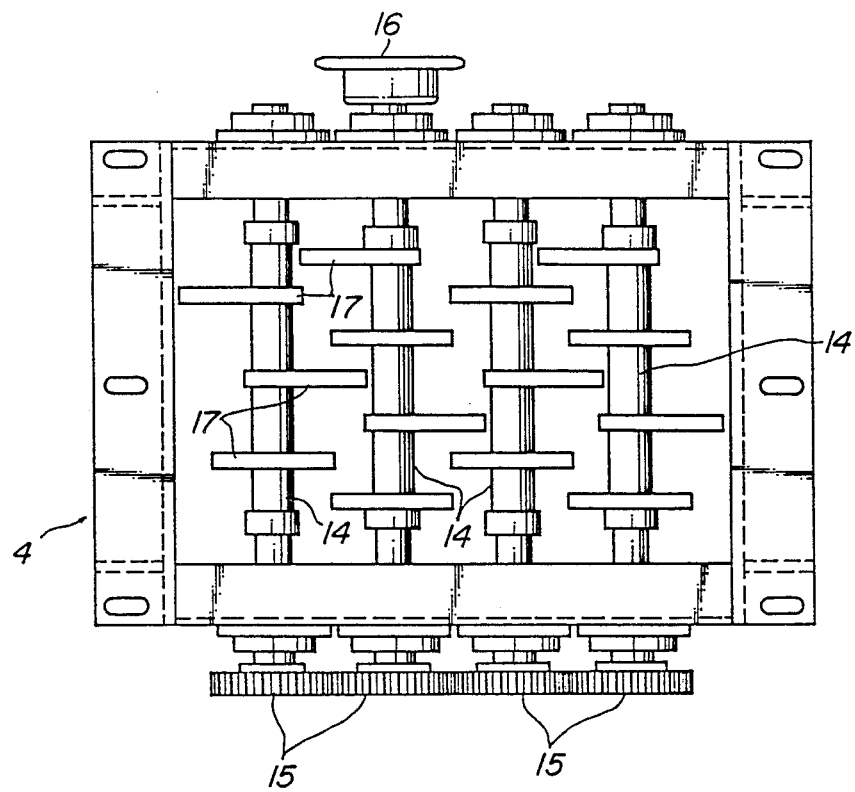
FIG. 3 is a plan view illustrating one example of an arrangement of cams according to the invention.

In this embodiment, moreover, four shafts 14 are arranged and journaled in parallel with each other in a horizontal plane directly above the rows of the pressing means 10 as shown in FIG. 3. These shafts are provided on one end with spur gears 15 meshing in series with each other to drivingly connect these shafts. Any one of the shafts is provided at the other end with a chain sprocket 16 secured thereto as driving input means. Moreover, cams 17 having respective phase differences are provided at locations on the shafts 14 corresponding to the pressing means 10.

With this arrangement, the cams 17 contact upper portions of the pressing means 10, respectively, and function to lower the pressing means 10 against forces of the coil springs 13. In this embodiment, the cams 17 are in the form of circular discs. With the arrangement shown in FIG. 3, the cams 17 on the left end shaft 14 are eccentric onto the left, right and upper sides in sequence from the upper side of the drawing FIG. 3. The cams 17 on the second shaft 14 are eccentric onto the left, upper, right and lower sides. The cams 17 on the third shaft 14 are eccentric onto the lower, right and upper sides. The cams 17 on the right end shaft 14 eccentric onto the left, upper and right sides. In this manner, it is preferable that phases of the cams on each of the shafts are shifted to each other and phases of the cams on the adjacent shafts are shifted to each other.

Figure 4:
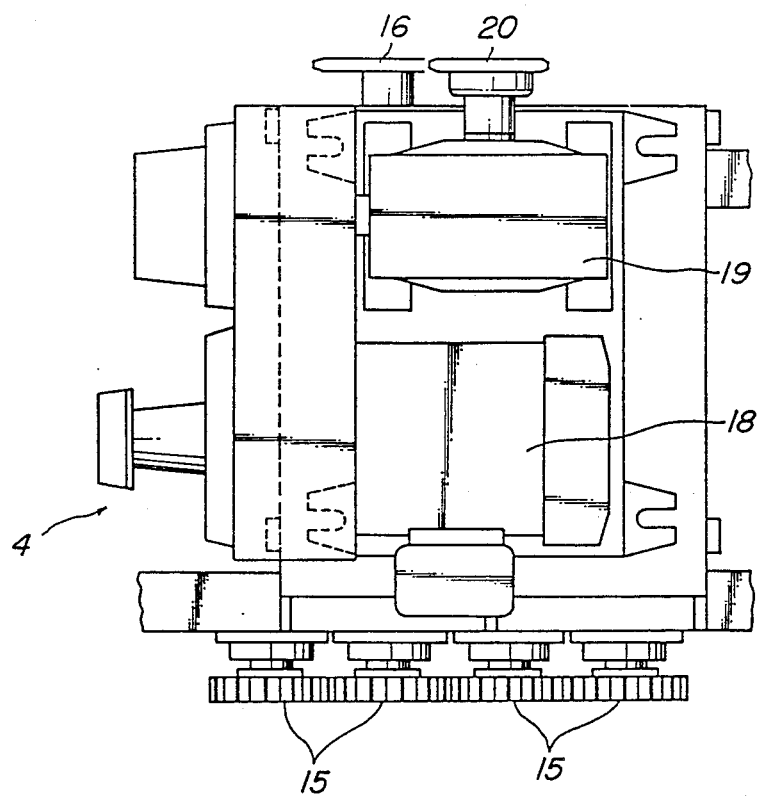
FIG. 4 is a plan view illustrating one example of rotating driving means for cams according to the invention.

In order to rotate the shafts 14 and hence the cams 17 provided thereon in synchronism with each other, a motor 18 having stepless speed change means attached thereto and a speed reduction device 19 are arranged on the apparatus frame 4 as shown in the plan view of FIG. 4. The motor 18 having the stepless speed change means and the speed reduction device 19 are interconnected by means of a belt (not shown), while the speed reduction device 19 is provided with an output sprocket 20 which is connected to the chain sprocket 16 mounted on the shaft 14 by means of a chain 21 as shown in FIG. 1.

Therefore, rotating driving means for rotating the cams 17 in synchronism with each other is constituted by the motor 18, speed reduction device 19, chain sprockets 16 and 20, chain 21, and spur gears 15 mounted on the associated shafts 14, respectively.

A work positioning plate 22 is positioned on one side of the slat conveyor 3 and driven by a cylinder or the like in a direction perpendicular to the moving direction of the slat conveyor 3. The work positioning plate 22 cooperates with a positioning plate fixed onto the other side of the slat conveyor 3 to maintain the foamed products supplied into the apparatus at predetermined positions on the slat conveyor 3.

Reference numeral 23 denotes a suction duct for exhausting gases derived from the breakage of cell films of foamed products.

In breaking cell films of foamed products with the apparatus constructed as above described, the foamed products are supplied into the apparatus by operating the slat conveyor and when amount of the supplied foamed products becomes a predetermined value, the slat conveyor 3 is stopped by an operation of, for example, photoelectric means. Thereafter, the pneumatic cylinder is actuated to lower the apparatus frame 4 so that the pressing means 10 are lowered to proper positions corresponding to thicknesses of the foamed products and further lowered in the order of the eccentricities of the cams 17 against the spring forces of the coil springs 13.

As a result, the pressing portions 9 of the pressing means 10 compress the same portions of the foamed products with compressed amounts of generally 50–90% and at rates of preferably 0.5–5.0 times/sec so that cell films of the products are broken.

When the cell films are broken in this manner, it is preferable to select the portions of the foamed products to be compressed in order to avoid positions where reinforcing members are embedded in the foamed products. However, even if one pressing portion 9 presses the embedded portion of the reinforcing member, the majority of the remaining pressing portions 9 have not yet lowered to their pressing positions at that same instant. Other portions of the embedded reinforcing members can be displaced relatively freely in the foamed products without being restrained by the pressing portions 9. Therefore, deformations and damage of the embedded reinforcing members can be prevented. In addition, the foamed products themselves can be prevented from being ruptured.

In order to make the above effect more significant, the apparatus frame 4 supported by the pneumatic cylinders 6 is constructed so that when the pressing forces acting upon the foamed products by the pressing portions 9 exceed a predetermined value, for example, 10 kg, the apparatus frame 4 is raised in response to the reaction to the pressing forces of the pressing portions 9.

Moreover, the pressing by the pressing portion 9 at one position is repeated for example 5-15 times to break cell films substantially completely. Thereafter, the rotating driving means is deenergized and the apparatus frame 4 is raised by the pneumatic cylinder 6. The slat conveyor 3 is then advanced a predetermined distance to bring the unbroken cell film portion of the foamed product into the position below the pressing means 10. Subsequently, the same operation as above described is repeated preferably over the overall length or width of the foamed product.

If it is desired to avoid the breakage of the cell films in reinforcing member embedded portions, it is preferable that the foamed product is accommodated in a vacuum chamber and cell films are previously broken under a negative pressure of 20-100 mmHg either before starting the breaking operation or after completion of the breaking operation, preferably before the starting of the operation.

Figure 5:
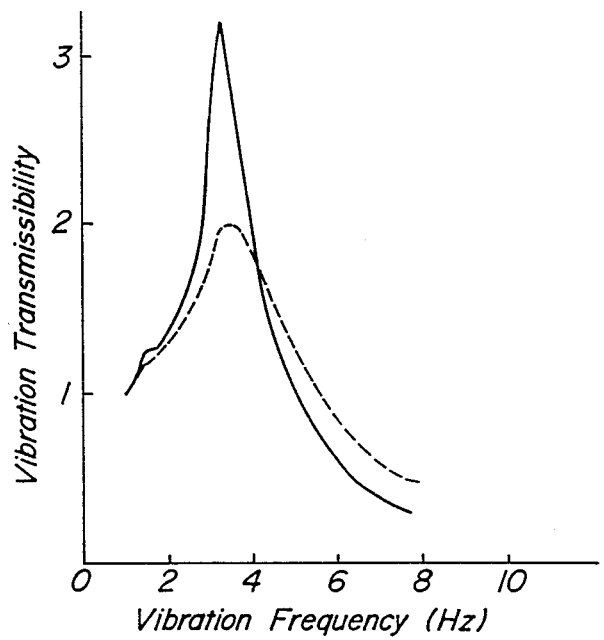
FIG. 5 is a graph of improved vibration transmissibility illustrating the effect of the invention.

In connection therewith, vibration transmission characteristics (JASO B408-84) of foamed products whose cell films were broken by the apparatus according to the invention in sequence with vacuum breaking. The result is shown in FIG. 5. As can be seen from the graph, the vibration transmissibility (solid line) at the resonance frequency of the foamed products subjected to both the vacuum and pressing breaking operations is much higher than that (broken line) of foamed products subjected to only the vacuum breaking operation. Moreover, the resonance frequency of the former is less than that of the latter. It is therefore, understood that the use of both vacuum breaking and mechanical or pressing breaking can greatly improve the elasticity of foamed products.

Furthermore, the permeability (JASO M313-83 frazzle type permeability) of foamed products subjected to both vacuum breaking and mechanical breaking operations is 24.0 cc/cm²/sec. Whereas the permeability of those subjected to only vacuum breaking operation is 8.2 cc/cm²/sec.

As can be seen from the above description, according to the invention all cell films of foamed products can be broken uniformly or without omission at a high ratio of broken cell films to unbroken cell films with less man-hours. Moreover, by separately lowering a plurality of the pressing means in the predetermined sequence, the deformation and damage of reinforcing embedded members and rupture of foamed products can be effectively prevented. This effect can be more improved by intentionally avoiding pressing the reinforcing member embedded portions of foamed products.

While the invention has been particular shown and described with reference to preferred embodiments thereof, it will be understood by those skilled in the art that the foregoing and other changes in form and details can be made therein without departing from the spirit and scope of the invention.

What is claimed is:

1. A cell film breaking apparatus for foamed products comprising transfer means for transferring the foamed products through the apparatus, an apparatus frame arranged above the transfer means to be raised and lowered relative to the transfer means by means of reciprocating means, a plurality of pressing means mounted on the apparatus frame to be urged upward relative thereto, cam means driving the pressing means downward, respectively, and rotating driving means for rotating the cam means in synchronism with each other.

2. A cell film breaking apparatus as set forth in claim 1, wherein said reciprocating means comprises a plurality of pneumatic cylinders operated in synchronism with each other.

3. A cell film breaking apparatus as set forth in claim 1, wherein the plurality of the pressing means are arranged in rows and the pressing means in the adjacent rows are arranged staggered.

4. A cell film breaking apparatus as set forth in claim 1, wherein each of said pressing means comprises a rod-like member and a hemispherical pressing portion provided at a lower end of the rod-like member.

5. A cell film breaking apparatus as set forth in claim 4, wherein each of said pressing means further comprises a cylindrical member upstandingly mounted onto the apparatus frame for receiving the rod-like member and a coil spring interposed between an intermediate portion of the rod-like member and an inner lower end of the cylinder member, thereby urging the rod-like member upward relative to the apparatus frame.

6. A cell film breaking apparatus as set forth in claim 4, wherein a projection area of the hemispherical pressing portion on a horizontal surface is 10-80 cm².

7. A cell film breaking apparatus as set forth in claim 4, wherein a radius of curvature of the hemispherical pressing portion is within a range of 5-50 mm.

8. A cell film breaking apparatus as set forth in claim 3, wherein the number of the pressing means is 5-20 which are arranged as closely as possible without interfering with each other.

9. A cell film breaking apparatus as set forth in claim 3, wherein a plurality of shafts are journaled in parallel with each other corresponding to the rows of the pressing means and driven by gears provided at one ends of the shafts and the cam means comprises cams in the form of circular discs provided on the shafts corresponding to the pressing means so that phases of the cams on each of the shafts are shifted to each other and phases of the cams on the adjacent shafts are shifted to each other.

* * * * *